(12) United States Patent
King et al.

(10) Patent No.: US 6,281,679 B1
(45) Date of Patent: Aug. 28, 2001

(54) WEB THICKNESS MEASUREMENT SYSTEM

(75) Inventors: Harriss T. King, Cupertino; Peter Haefner, San Jose, both of CA (US)

(73) Assignee: Honeywell - Measurex, Cupertino, CA (US)

( * ) Notice: Subject to any disclaimer, the term of this patent is extended or adjusted under 35 U.S.C. 154(b) by 0 days.

(21) Appl. No.: 09/218,266

(22) Filed: Dec. 21, 1998

(51) Int. Cl.⁷ .............................. G01B 7/06; G01B 11/06; G01R 33/00; G01N 27/72

(52) U.S. Cl. ......................... 324/229; 324/226; 356/630

(58) Field of Search .................................... 324/229, 230, 324/231, 225, 226, 227, 262; 73/159; 356/375, 376, 381, 630; 250/559.27

(56) References Cited

U.S. PATENT DOCUMENTS

| | | |
|---|---|---|
| 4,107,606 | 8/1978 | Typpo et al. . |
| 4,276,480 | 6/1981 | Watson . |
| 4,678,915 | 7/1987 | Dahlquist et al. . |
| 5,010,766 | * 4/1991 | Typpo ................................... 73/159 |
| 5,210,593 | 5/1993 | Kramer . |
| 5,355,083 | 10/1994 | George et al. . |

* cited by examiner

*Primary Examiner*—Walter E. Snow
(74) *Attorney, Agent, or Firm*—Burns Doane Swecker & Mathis; Anthony E. Ebert

(57) ABSTRACT

A non-contacting thickness measurement apparatus is described, which is capable of on-line, highly accurate web thickness measurements. The apparatus is comprised of a first and second distance determining means which calculate a distance value from each distance determining means to the web surface. The distance determining means are on opposite sides of the web, so each measures the distance to a different side of the web. At the same time, the distance between the two distance determining means is measured to produce a z-sensor spacing value. The two distance values are thereafter subtracted from the z-sensor spacing value to get a web thickness value. An x-y position adjustment means is used to keep the measurement spot on the web for the two distance determining means at the same location on the web, and several techniques are combined to eliminate temperature-induced and/or other unknown variations or drifts in the web thickness value which are not caused by actual changes in the thickness of the web.

28 Claims, 5 Drawing Sheets

WEB THICKNESS MEASUREMENT SYSTEM

BACKGROUND OF THE INVENTION

The present invention relates generally to non-contacting thickness or caliper measurements, and more particularly to use of distance determining means to make highly accurate on-line thickness measurements of a moving web or sheet.

Numerous methods exist for measuring the thickness of a moving web or sheet, such as paper. Two of the most common include a direct thickness measurement using contacting glides or shoes, which skim along the two surfaces of the web, and a non-contacting inferential method in which radiation absorption by the web is used to determine the weight per unit area of the web and the thickness is thereafter inferred, provided the density of the material is known with sufficient precision. Many variations and improvements to these methods exist, but each of the techniques has underlying drawbacks.

The contacting method is subject to three fundamental types of problems. First, the method can be limited by the strength of the material being measured. With fragile sheets such as tissue, for example, there is a tendency for the contacting shoes to snag deviations in the sheet surface, causing flaws in the sheet or even causing the sheet to tear. Second, the sheet itself can damage a contacting caliper sensor due either to abrasive wear on the contacting elements or to physical damage arising during sheet breaks. For caliper sensors which traverse the sheet, damage can also be caused when the sensor crosses the sheet edge. Third, the accuracy of contacting sensors can be adversely affected by the buildup of contaminants on the contacting elements, as may occur with coated or filled sheets or sheets containing recycled materials The non-contacting inferential thickness measurement methods avoid many of the problems of the contacting methods, but are subject to a new set of problems. For example, radioactive sources—common for thickness measurements when the density of the product is assumed to be known—are not permitted in some web markets. Also the radioactive measurement is inferential, which means that if the density of the web is not as predicted, there may be significant errors in the calculated thickness value.

Several inventors have suggested that use of lasers to measure the thickness of a moving web may be a promising option compared to the other methods available. R. Watson describes one such system in U.S. Pat. No. 5,210,593 and W. Kramer describes another such system in U.S. Pat. No. 4,276,480. In both these systems, the laser caliper apparatus comprises a laser source on either side of the web, whose light is directed onto the web surface and subsequently reflected to a receiver. The characteristics of the received laser signal are thereafter used to determine the distance from each receiver to the web surface. These distances are added together, and the result is subtracted from a known value for the distance between the two laser receivers. The result represents the web's thickness.

The non-contacting approaches to thickness measurement indicated above have the desirable feature that they eliminate many of the disadvantages of the contacting method and the non-contacting inferential methods. However, there are difficulties with previous non-contacting techniques which can limit their use to relatively low-accuracy situations.

One of the problems is that the web may not always be perpendicular to the incident light, since the web has a tendency to bounce or develop intermittent wave-like motion. If the web is non-perpendicular to the incident light and the light beams from two opposing light sources are not directed to exactly the same spot on the sheet, substantial error in measurement can occur. This is caused by two factors. First, actual web thickness variations from the first laser's measurement spot to the second laser's measurement spot can cause an incorrect thickness measurement. Second, if the web is not perpendicular to the incident light, the measurement technique will cause an error in the thickness value proportional to the web's angle and to the displacement on the sheet surface between the two measurement spots. Bouncing or oscillation of the web can further exacerbate this error.

Various minute changes in system geometry, due for example to thermal effects on physical dimensions of the measurement apparatus or on device calibration, can also degrade the measurement accuracy. These effects can be difficult to quantify directly, for example, by measuring temperatures at various points in the apparatus and applying appropriate correctors. The effects become substantially more significant as the accuracy level of the measurement device approaches that required for the measurement and control of products such as newsprint or other thin products.

SUMMARY OF THE INVENTION

To solve these and other problems, the Applicants have developed a non-contacting thickness measurement apparatus which is capable of highly accurate on-line web thickness measurements even when continuously scanning the measurement apparatus across the web.

The Applicants' system comprises a first and second distance determining means which generate a perpendicular distance value from each distance determining means to the web surface. The distance determining means are on opposite sides of the web, so as to measure the position of each side of the web surface (i.e. in the z-direction or perpendicular to the web), and the measurement spot locations are controlled to be precisely aligned with one another in the lateral direction (i.e. in the x-y plane). At the same time, the z-direction separation between the two distance determining means is measured by a third displacement sensor whose measurement output is not affected by the presence of the intervening web. The two distance values are thereafter subtracted from the z-direction separation to get a web thickness value.

As key parts of the invention, a position sensing and adjustment means is used to keep the measurement spot on the web for the two distance determining means at the same location in the x-y plane, and several techniques are combined to eliminate subtle measurement inaccuracies due to temperature and/or other effects.

DETAILED DESCRIPTION

Figure 1:
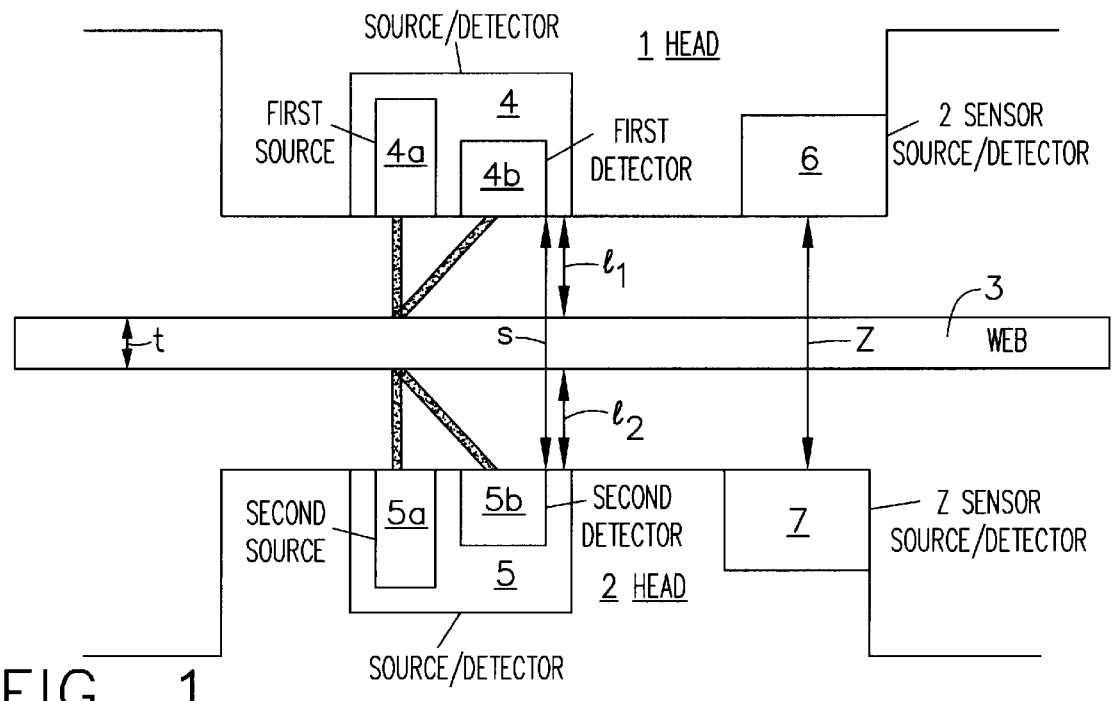
FIG. 1 provides a basic concept schematic diagram for a standard thickness measurement apparatus, without the Applicants' improvements.

The general concept behind a non-contacting thickness measurement is first described to provide a common set of terms and variables. Referring to FIG. 1, in a common type of system, first and second enclosures (hereafter called "heads"), 1 and 2 respectively, may contain various sensor devices for measuring qualities, characteristics, or features of a moving web of material identified as 3. Heads 1 and 2 lie on opposite side of web or sheet 3, and, if the measurement is to be performed in a scanning manner across the web, are aligned to travel directly across from each other as they traverse the moving web. A first source/detector 4 is located in first head 1. A second source/detector 5 is located in second head 2. Source/detectors 4 and 5 comprise closely-spaced first and second sources 4a & 5a, respectively, and first and second detectors 4b & 5b, respectively, arranged so that measurement energy from first source 4a and interacting with a first surface of web 3 will return, at least in part to first detector 4b, and measurement energy from second source 5a and interacting with the opposite, or second surface, of web 3 will return, at least in part to second detector 5b.

In this described system, the web-facing surfaces of the first and second sources comprise a first and second reference location, respectively. In a more general system, the sources need not lie at the reference locations, and may actually lie at separate locations. In fact, more than one detector or reference location may be used to improve accuracy of the device, without disturbing the Applicants' concept. For simplicity, however, the following description assumes the web-facing surface of the sources lie at the respective reference location for each distance determining means.

In the Applicants' preferred embodiment, the source and detectors comprise an optical source and detector, and in a particularly preferred embodiment they comprise a laser triangulation source and detector. Other types of source/detectors are of course possible, some of which are mentioned below. In any event, the source/detector arrangement may be called, and will be referred to generally as a distance determining means.

From the intensity, phase, location or other characteristics of the measurement energy returning to the detector, and/or the path length from the source to the detector or reference location, values for the distance between each distance determining means and a measurement spot on one of the web surfaces may be determined. For first distance determining means 4, the detected distance value between the distance determining means and a first measurement spot on the web surface will be referred to as $l_1$ and for second distance determining means 5, the detected distance value between the distance determining means and a second measurement spot on the opposite web surface will be referred to as $l_2$, as shown in FIG. 1. For accurate thickness determination, the first and second measurement spots must be at the same point in the x-y plane, but on opposite sides of the web (i.e. the measurement spots will be separated by the web thickness).

While the Applicants prefer to use an integrated source/detector structure, the optical source and detector may also be separate structures within the head. Such an embodiment would still be suitable for Applicants' invention. Further, the Applicants contemplate that the distance determining means described above may be replaced with any distance measuring system capable of non-contacting distance measurements with the required accuracy. In addition to laser-based triangulation devices mentioned already, other possible apparatus include confocal imaging displacement devices, nuclear, IR, RF, radar or microwave radiation-based devices, acoustic-based systems, pneumatic-based devices, or other types of systems.

In an ideal static situation, the separation, s, between first and second distance determining means 4 and 5 of FIG. 1 would be fixed, resulting in a calculated value for web thickness, t, of:

$$t = S - (l_1 + l_2), \tag{1-1}$$

Figure 2:
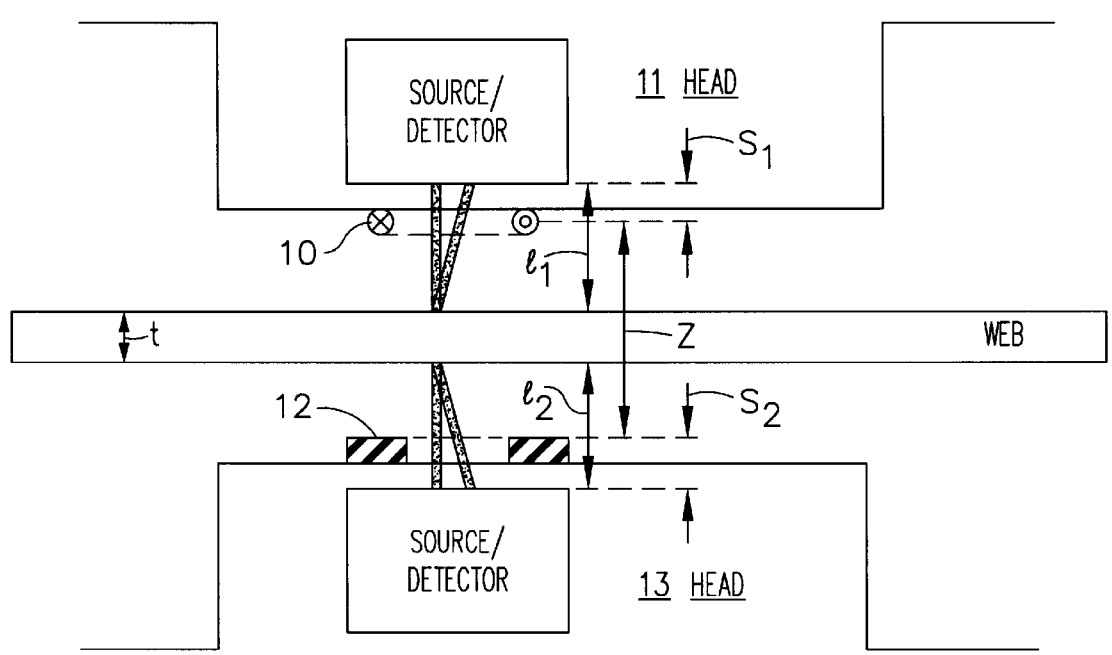
FIG. 2 shows a basic concept schematic diagram for a standard thickness. measurement apparatus, including typical offsets for z-direction measurement components, and the distance determining means and the z-sensor means in the preferred geometry.

In reality, separation s can vary slightly due to thermal expansion and vibration effects, and, for a system in which the measurement apparatus traverses the web for full-width measurement, due to mechanical imperfections in the structure on which the scanning heads are mounted. To correct for this inconstancy in the separation s, a dynamic measurement of the spacing between the scanning heads is provided by a z-sensor means, which measures a distance z, between a z-sensor source/detector 6, located in the first head 1, and a z-sensor reference 7, located in the second head 2, as shown in FIG. 1. A coil, used as the z-direction source/detector, and a metal reference plate, used at the z-sensor reference, operating on measurement of eddy currents, for example, is one possible method of determining the distance z. For reference, the distance z may be called and will be referred to as the z-sensor spacing value. An appropriate z-sensor is described in detail in U.S. Pat. No. 4,160,204 which is hereby incorporated by reference. Although not drawn as such in FIG. 1 because of the desire for clarity of concept, it is of great importance in the implementation of the z-sensor that the source/detector coil on one side of the web and the reference plate on the other side of the web be centered (cylindrically symmetric) about the line of the incident light beams, as shown in FIG. 2. In FIG. 2, a source/detector coil 10 and metal reference plate 12, are both viewed from the side. Without a centered geometry, relative tilts between the two heads can lead to large discrepancies between the true z separation at the position of the distance determining means and the apparent z separation measured at the position of the z sensor. Interference with the incident and scattered light in the centered geometry is avoided by use of a coil of sufficient diameter on the z sensor source/detector side of the web, and, on the z sensor reference plate side of the web, by use of a reference plate with a slotted hole of sufficient size to prevent interference. Of course, other methods of dynamic measurement of spacing between the scanning heads are possible, such as RF source and receiver coils, hall devices, or magnetoresistive devices, but the method chosen must be capable of sufficient accuracy. For example, the eddy current method described above has an accuracy of well under a micron if the temperature of the coil and associated electronics are well controlled.

In any event, in the simplified diagram of FIG. 1, the separation, s, of the two distance determining means is identical to the z sensor spacing value, z. In practice, as indicated in FIG. 2, there are offsets s1 and s2 between the distance determining means and the z sensor means, and the separation s is then given by $$s=z+S_1+S_2 \tag{1-2}$$

The offsets $s_1$ and $s_2$ are constant provided the z-sensor means are rigidly mounted with respect to the distance measuring means. Small deviations from constancy in these offsets, due for example to thermal expansion, can be corrected using means described later in this patent application. Combining equations (1-1) and (1-2) it is possible to express the thickness of the web, t, in terms of the measured displacements $l_1$, $l_2$, and z, as:

$$t=z-(l_1+l_2)+(S_1+S_2) \tag{1-3}$$

The above-described system, without further improvements, will typically result in web thickness values with an accuracy insufficient for use in high-precision applications such as the measurement and control of thin paper (e.g. newsprint) as it is being made on a paper machine. To reach higher levels of performance requires the control of a number of smaller and more subtle effects. First, alignment of the distance determining means to measure at exactly the desired location on the web is critical. The measurement spot for the two distance determining means must lie directly across from each other to prevent web alignment from substantially affecting thickness accuracy. Second, strict control of temperature changes, or correction for these changes as well as other slow changes such as slight drifts in device calibrations, must be incorporated into the design, since most system components have temperature-induced variations and calibration drifts which will affect thickness measurement accuracy if not accounted for. Third, better control of web orientation relative to the thickness measurement apparatus— web stabilization—is required to reduce accuracy requirements otherwise demanded of the system components.

In principle, it should not be necessary to stabilize the web (i.e. maintain the web in a fixed x-y plane). Referring to equation (1-3), any change in $l_1$ due to a movement of the sheet in the z direction will be cancelled by an equal and opposite change in $l_2$. However, web stabilization is found to be important for two reasons. First, the exact cancellation noted above at the desired sub-micron level requires exceptionally high precision and linearity in the distance determining means. Reducing the allowed web movement in the z-direction can reduce these requirements to a feasible level. Second, as will be discussed below, angular misalignment in the web that makes the web surface non-perpendicular to the distance determining means can cause significant thickness errors if the distance determining means are misaligned in the plane of the sheet. Proper web stabilization can significantly reduce these angular misalignments in the web and thus reduce the demands on the alignment of the distance determining means.

Figure 3:
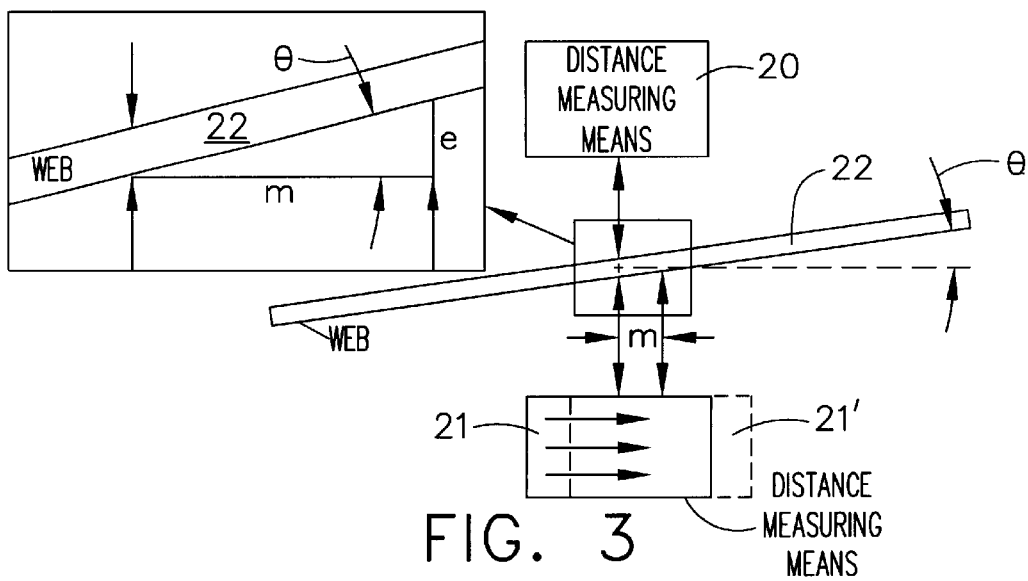
FIG. 3 shows the effect of a tilted web on thickness measurement, if the measurement spots for the distance determining means are offset from each other.

As indicated, it has been noted that non-alignment of the measurement spots for the distance measurement means can cause a substantial error in the web thickness value. To demonstrate why this is the case, reference is made to FIG. 3. Boxes labeled 20 and 21 represent a pair of distance determining means. The web is labeled 22, which is shown at an angle of θ degrees from perpendicular to the surface of distance determining means 20 and 21.

A dotted line box 21', shown partially overlapping with box 21 indicates movement of distance determining means 21 and its associated measurement spot on the web, due to external factors out of control of the designer. The distance the measurement spot for distance determining means 21 is offset from the measurement spot for distance determining means 20 is shown as a distance, m, in FIG. 3. In this example, it is desirable that the measurement spots for both distance determining means lie at the same point in the plane of the web.

From this figure, we can determine the error, e, in the web thickness value in terms of the movement, m, of the distance determining means 21 as:

$$e=m \tan (\theta), \tag{1-4}$$

For example, if the angle of the web, θ, is one degree, and the movement, m, of distance determining means 21 is of the same order of magnitude as the web thickness value, two to three percent errors in the web thickness value will result. As a more quantitative example, an alignment error, m, of a millimeter can result in a thickness error of many microns even if the web angle is only a few tenths of a degree. As these rough calculations show, movement of the measurement spots can result in substantial errors in the web thickness value.

Figure 4B:
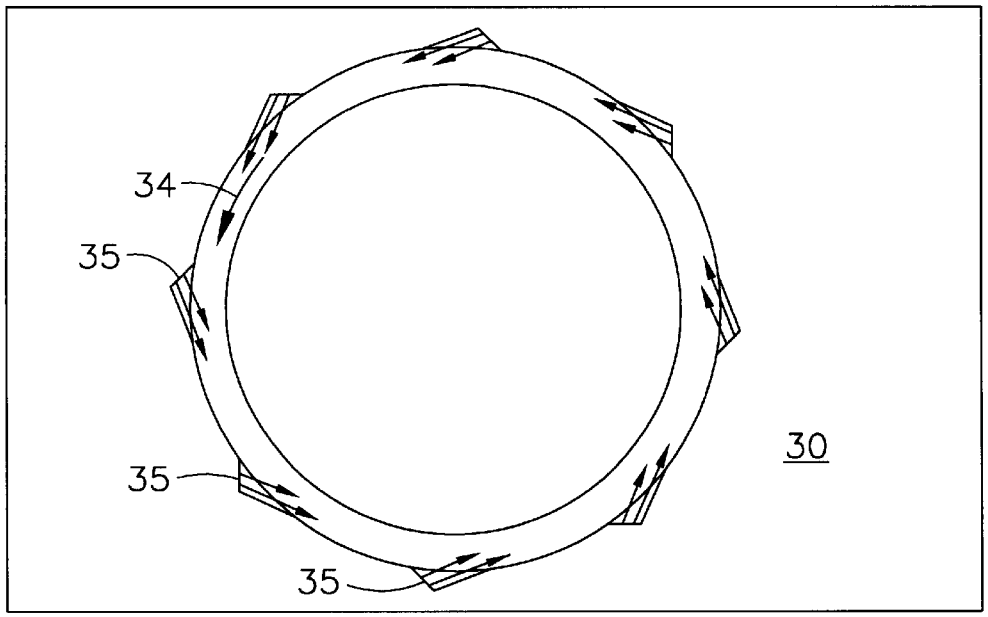
FIG. 4b shows the clamp plate from above, with the web removed.
Figure 4A:
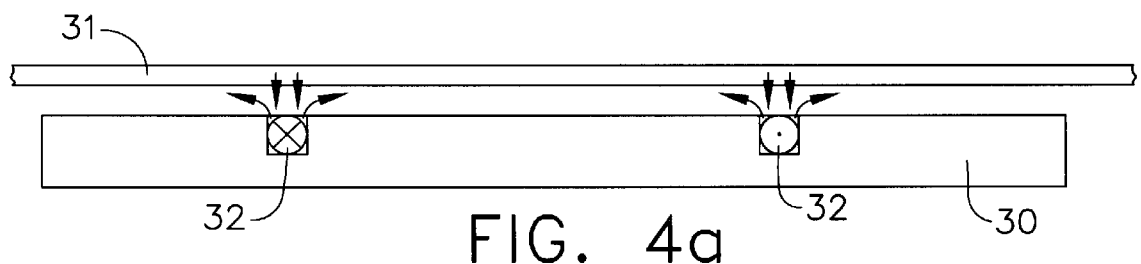
FIG. 4a shows a side view of an air clamp plate, and the forces applied to the web when the air flow is operational.

To reduce the demand on measurement spot accuracy, the web can be stabilized both in its z-direction movement and its angular alignment, thus keeping the web precisely perpendicular to the distance measuring means. To maintain the non-contacting nature of the measuring apparatus, an air-bearing stabilizer is strongly preferred, in which the stabilization is performed without touching the web. FIGS. 4a & 4b shows the elements and operation of a web stabilizer based on a vortex of moving air, hereafter referred to as an "air clamp". This stabilizer essentially comprises a clamp plate, 30, mounted near where web 31 is to be stabilized, and a circular air channel 32 in clamp plate 30 coincident with its upper surface. In FIG. 4a, the clamp plate is, shown in side view. In FIG. 4b, the clamp plate is shown from above, with the web removed. When air is introduced into the circular air channel 32 (i.e. so as to cause the air to travel the periphery of the channel as shown by arrow 34 in FIG. 4b), a field of low pressure is created over the channel. Web 31 is pulled toward this ring of low pressure, as indicated in FIG. 4. The air may be introduced, for example, via a series of air orifices 35, in the side of circular air channel 32, such as is shown in FIG. 4b. Simultaneously, a pocket of higher pressure is created by escaping air from channel 32 in the region adjacent the channel. This area of high pressure counteracts the attractive force of the low pressure area above the channel. By balancing these two forces, the web may be maintained in a fixed position relative to the channel, without requiring any part of the air clamp to come into physical contact with the web. The air escaping from the clamp plate also purges the region through which thickness measurements are made, assisting in keeping any optical or other sensitive portions of the thickness measurement apparatus clean of dust. In its preferred implementation, the air clamp is metallic and, in addition to its sheet stabilization effect, serves as the reference plate for the z-sensor.

While the air clamp significantly reduces the effect of web misalignment, residual web wrinkles or other deformations still exist which, unless the measurement spots of the two distance determining means are controlled so as to coincide, can introduce unacceptable errors in a high-precision thickness measurement. The description to follow describes one method for maintaining or adjusting the position of the distance determining means so that accurate thickness measurements may be taken even with these web movements and deformations.

The Applicants' preferred x-y position control means consists of two parts, a position sensing means for sensing the relative separation of the two distance determining means in the plane of the web, and a position adjustment means for adjusting the position of the distance determining means based on the location or displacement value from the position sensing means. Each part will be described separately below.

Relative movement (in the plane of the web) of the measurement spots for the two distance determining means may be either parallel to the direction of movement of the web (MD), perpendicular to the movement of the web (CD), or some combination of the two. The x-y position control means (where x and y are two mutually perpendicular axes in the plane of the web) will usually separate sensing and adjustment into two components; an x-axis component and a y-axis component. These axes may or may not correspond to the MD and CD directions. A displacement value indicating movement along each axis should be either directly available from a position sensing means, or should be calculable therefrom. For example, the position sensing means may calculate an absolute location or displacement value without regard for direction but this value should then be separable into x and y component values. While not critical, this requirement allows easy translation of position sensing means location or displacement values into necessary control signals for the position adjustment means.

One possible position sensing means comprises a pair of Hall Effect devices. The Hall Effect devices can be used to sense the position of the distance determining means relative to each other, one Hall Effect device sensing x-direction deviation, and the second Hall Effect device sensing y-direction deviations. (Note that other magnetic field sensing devices such as magnetoresistive devices could also be used in a manner similar to that described below for the Hall Effect devices.) The relative location of the two measurement spots on the web may then be inferred from the relative location of the distance determining means.

Figure 5:
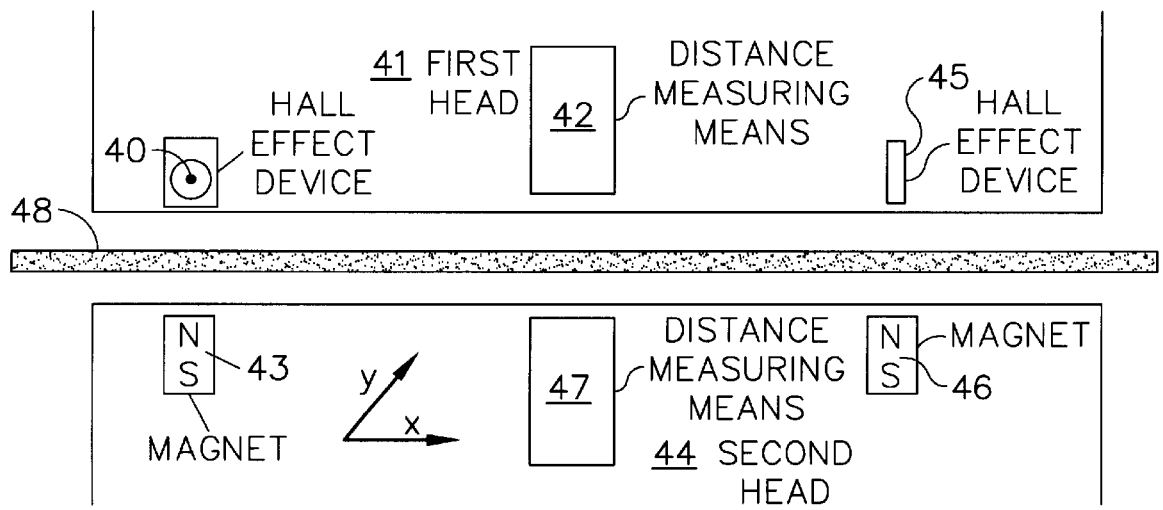
FIG. 5 shows the orientation and one possible set of locations in a scanning head for the x-y position sensing means components.

FIG. 5 shows one preferred orientation of the Hall Effect devices for accurate detection of the relative x and y locations of the two distance determining means. In this figure, web 48 is viewed from the side and is perpendicular to the plane of the figure and parallel to the top edge of the figure. The x axis is in the plane of the web, parallel to the top edge of the figure; the y axis is in the plane of the web but perpendicular to the plane of the figure; and the z axis is perpendicular to the web. First Hall Effect device 40 is mounted in first head 41, which contains first distance determining means 42. A reference bar magnet 43 is mounted in second head 44, and is aligned to lie directly across from first Hall Effect device 40. The sensitive direction of the First Hall Effect device 40 is precisely oriented such that it is sensitive only to the y-component of the magnetic field at its location. For a typical Hall effect device, this places the plane of the Hall generator in the x-z plane, as indicated in FIG. 5. Magnetic shielding (not shown in FIG. 5 for clarity) and/or careful placement within the head ensures that the Hall Effect device 40 is not affected by magnetic sources other than the reference magnet 43. Reference magnet 43 is oriented with its axis of symmetry in the z direction, as indicated in FIG. 5. In this arrangement, Hall Effect device 40 will register zero output (i.e., zero y-component of magnetic field) when the device is precisely aligned in the y-direction with the reference magnet 43. This is true independent of whether there is a relative x-displacement between the Hall Effect device 40 and the reference magnet 43, and is true irrespective of the relative z separation of the Hall Effect device and the reference magnet. Relative y movement of the Hall Effect device 40 relative to reference magnet 43 will result in a non-zero output from the device, with the sign of the output positive or negative depending on the direction of the movement along the y-axis. The response with movement along the y axis is quite independent of the relative x-position of the device and Reference magnet. That is, the output of the device is predominantly determined by its relative movement in the y-direction, independent of any movement in the x-direction. The field strength registered in the Hall Effect device 40 falls off strongly as the z separation between device and magnet is changed, which manifests itself as a decrease in the sensitivity of the y-dependence of the device output for larger z separations. However, it remains true that the detected field strength is zero only when the y alignment is perfect, and thus any position adjustment apparatus which positions the Hall Effect device 40 (or equivalently the reference magnet 43) so as to generate zero output from the device will ensure that there is zero y-misalignment between the Hall Effect device and the reference magnet.

In a second part of the upper scanning head, a second Hall Effect device 45 is mounted directly across from a second bar magnet 46, which containd second distance determining means 47. The sensitive direction of the second Hall Effect device 45 is precisely oriented such that it is sensitive only to the x-component of the magnetic field at its location. For a typical Hall Effect device, this places the plane of the Hall generator in the y-z plane, as indicated in FIG. 5 where this device is viewed side-on. The same series of explanations and descriptions apply to this second Hall Effect device and reference magnet as to the first Hall Effect device and reference magnet, with the exception that the second Hall Effect device and reference magnet generate an output representative of relative movement in the x direction rather than the y direction. Again, the output of the second Hall Effect device is zero only when it is precisely aligned with its reference magnet, and any position adjustment apparatus which positions the Hall Effect device 45 (or equivalently the reference magnet 46) so as to generate zero output from the device will ensure that there is zero x-misalignment between the Hall Effect device and the reference magnet.

Of course, other orientations of the Hall Effect or other magnetic field sensitive devices are possible relative to the reference magnets, as long the placement allows sensing of only one-axis movements in each case, or in some other manner allows decoupling of the x and y movement.

From the Hall voltage, it is possible to calculate, for both x and y axes, the relative displacement of the Hall Effect device relative to its reference magnet. As noted above, this voltage is positive or negative (in the preferred implementation described above) depending on the sign of the displacement away from perfect alignment of Hall Effect device and reference magnet, and is zero at the point of perfect alignment. The relative displacement values for x and for y can be supplied to the position adjustment means, either in analog voltage form or in digital form via a microcontroller, which coverts the relative displacement value to a control signal for the position adjustment means.

The Applicants have discovered that, if Hall Effect devices are to be used effectively in the Applicants' invention, temperature effects must be de-coupled from the Hall Effect device measurements. While this may in principle be done by measuring temperature, and subsequently correcting or controlling temperature, the Applicants have developed a more accurate and reliable method of de-coupling temperature from the Hall Voltage.

Figure 6A:
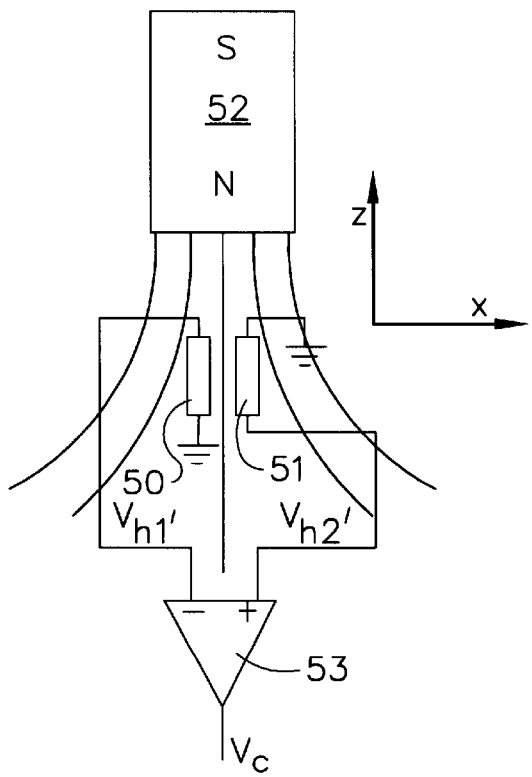
FIG. 6a shows one arrangement of the paired Hall Effect devices in the magnetic field of the reference magnet, and associated electronics.

To de-couple the Hall Voltage from temperature, two Hall Effect devices, whose calibration and temperature characteristics have been matched, are arranged back to back, such that while temperature-induced variations will be of the same magnitude and sign, the response to an imposed magnetic field will be of the same magnitude but of opposite sign. An arrangement of the paired Hall Effect devices is shown in FIG. 6a. The sensitive directions for these two devices are opposite to one another.

For first Hall Effect device 50, the Hall voltage is:

$$V_{h1}'=V_h+V_t, \quad (1\text{-}5)$$

where $V_h$ is the Hall voltage expected at the given magnetic field and at the calibration temperature, and $V_t$=the voltage offset caused by a temperature difference from the calibration temperature.

For the second Hall Effect device 51, the Hall voltage is:

$$V_{h2}'=-V_h+V_t \quad (1\text{-}6)$$

As the reader will understand, the relationship of the Hall voltage $V_h$ to the magnetic field (or, equivalently, to the displacement of the Hall Effect device with respect to a reference magnet 52) will have been set or determined during a calibration step, in which a known magnetic field and known temperature were applied to the Hall Effect device. The two devices will subsequently have been matched so as to provide identical behavior both with magnetic field changes and with temperature changes.

If the first and second Hall Voltages are thereafter subtracted, such as in an operational amplifier 53, we can determine a corrected Hall Voltage, $V_{hc}$:

$$V_{hc}=V_{h2}'-V_{h1}'=2\,V_h,$$

or $$V_h=½\,V_{hc}$$

Thus, the measurement of the Hall voltage has been decoupled from temperature, and $V_{hc}$ represents the measure of magnetic field and thus the change in the position of Hall Effect devices 50 or 51, independent of temperature changes.

A magnetoresistive sensor configured as a magnetic field direction sensor is a second possible option for determining the relative separation in the x and y directions of the two distance determining means. One pre-manufactured device for use as a position sensing device is manufactured by Honeywell, Inc., in Minneapolis Minn., under Part No. HMC1501. The output provided from this device represents the angle of the magnetic field lines passing through the magnetoresistive device, in the plane of the device. It is insensitive to components of the field outside the plane of the device. The magnetoresistive field-direction device can be oriented such that when the distance determining means is properly aligned, the angle seen by the magnetoresistive device is zero, and as the distance determining means becomes misaligned, the angle seen by the magnetoresistive field-direction device becomes nonzero.

Figure 6B:
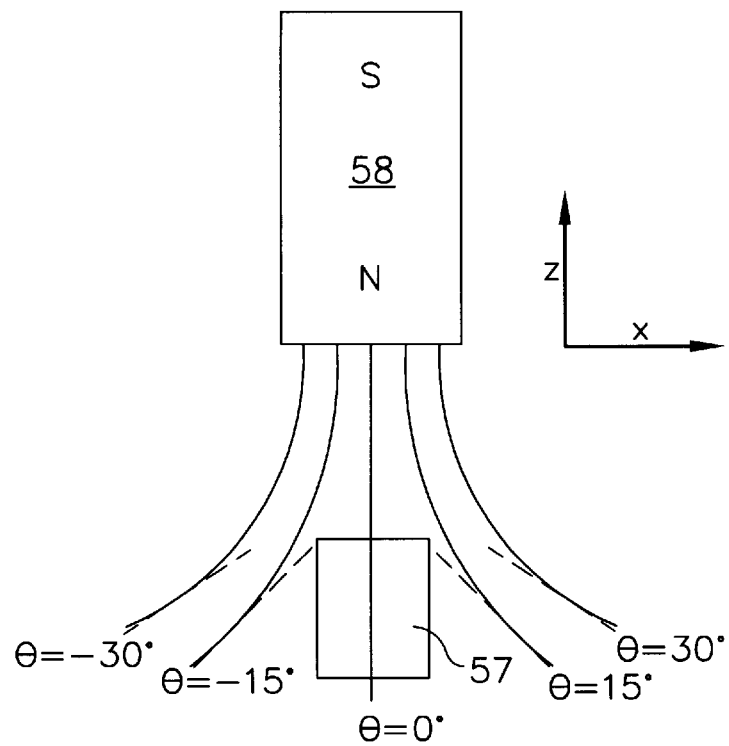
FIG. 6b shows the orientation of the magnetoresistive device in the magnetic field, and the magnetic field lines and their respective angles at several places.

FIG. 6b shows the orientation of the magnetoresistive field-direction device in the magnetic field, and the magnetic field lines and their respective angles at several places. Placement of the reference magnet is similar to placement of the magnet for the Hall Effect device. Unlike the Hall Effect device however, the magnetoresistive field-direction device is sensitive to magnetic field in the plane of to chip, and so must be arranged to account for this. Thus, in FIG. 6b, magnetoresistive field-direction device 57 is oriented so as to measure the magnetic field direction in the x-z plane, and consequently to measure position changes in the x direction. When the magnetoresistive device is perfectly aligned with reference magnet 58, the angle registered is zero degrees. When the magnetoresistive device is off-center from the reference magnet in the x direction, the angle of the magnetic field lines will be registered, and these angles can be directly related to x misalignment.

The output provided by the magnetoresistive device will indicate the position of the distance determining means, relative to a reference position such as the aligned position of the distance determining means. This relative position value may then be translated, via analog or digital means, into a control signal for the position adjustment means.

While the Applicants have identified two methods of measuring the location of the two distance determining means relative to each other, there are many other methods available. The foregoing were provided as illustrative examples only.

There are many possible methods of adjusting the relative measurement spots of the two distance determining means once the position sensing means has detected a misalignment. The Applicants describe one preferred system only for purposes of brevity. It is noted that other types of movable support members and motor drive schemes are possible, including (for the movable support members) roller bearings, linear bushing bearings, pivoting structures, threaded shafts, adjustable air cavities or other methods as may occur to the reader, and (for the motor drive schemes) various alternative types of electric or pneumatic motors.

In any event, the Applicants have found particular success with a movable support system for the distance determining means comprised of elastic slat or strip members (i.e. movable support members) for mounting one distance determining means in one of the sensor heads, coupled with non-contact magnetic deflection coils ("voice coils") for positional adjustment of the distance determining means in the xy plane (here x and y are axes in a plane parallel to the plane of the web). In the Applicants' preferred system, the second distance determining means is fixedly mounted in the remaining head, and the first distance determining means is adjusted to align with the stationary one. Obviously, other positional adjustment schemes are possible, for example one in which one head is mounted so as to be adjusted in the x direction and the other head in the y direction. The essential feature is that the deflection means be of sufficient force and speed of response to accurately adjust the distance determining means over the required adjustment range (which may typically be up to 2 mm in both x and y directions) and over the required frequency range (which may be up to 10 Hz for vibrations encountered in a scanning system).

Figure 7:
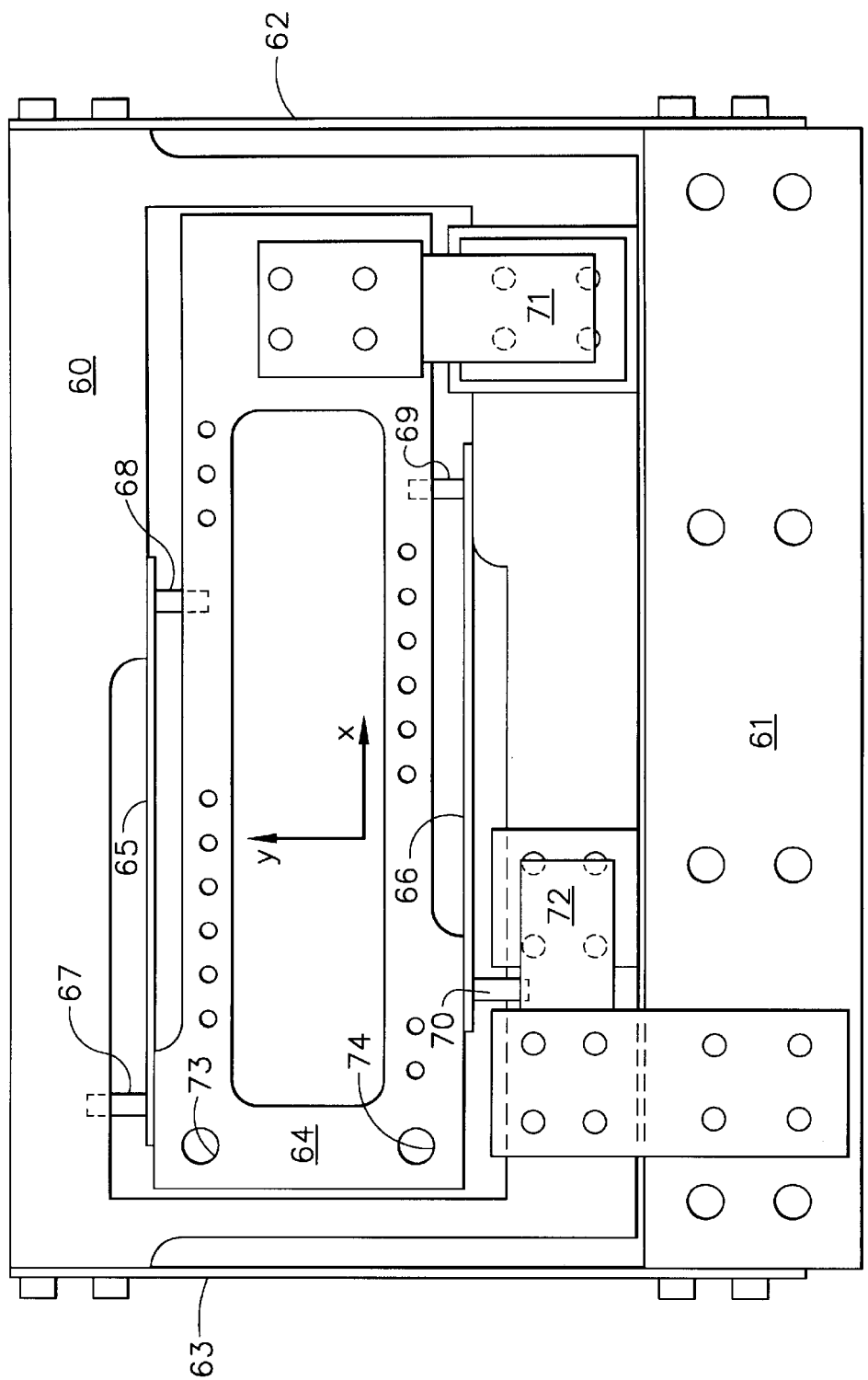
FIG. 7 shows a top view of the movable mounting frame of the distance determining means, including the elastic strips and the magnetic deflection coils.

A possible arrangement of the just described system is shown in FIG. 7. Outer mounting frame 60 is attached to fixed frame 61 via first and second elastic slat or strip members (i.e. leaf springs) 62 & 63, so that outer sensor mounting frame 60 is moveable generally perpendicularly to frame 61 (the x-direction of FIG. 7). Fixed frame 61 is rigidly mounted to the overall head enclosure. The leaf spring members 62 & 63 may comprise metal, plastic, or other material or combination of materials which are stiff in every direction except generally perpendicular to their surfaces. The slats or strips must be wide enough to resist bowing under the weight of the components mounted to them. The choice of material (such as spring steel) and physical shape for the slats or strips must be made in a way that places them safely inside their fatigue limit, allowing an infinite number of flexing operations over the required displacement range without failure. An inner sensor mounting frame 64 is mounted to outer sensor mounting frame 60 via third and fourth elastic strip members, 65 & 66. Elastic strip members 65 & 66 are arranged generally perpendicular to elastic strip members 62 & 63, so deflection of the inner sensor mounting frame 64 is in the y-directions of FIG. 7, perpendicular to deflection of outer sensor mounting frame 60. The distance determining means is mounted within the hole through the body of inner sensor mounting frame 64, as shown in FIG. 7. Depending on the size of the various mounting frame members, some form of stabilization means for the frame members may be required. For example, guide posts 67–70 prevent any torsional movement of inner sensor mounting frame 64 relative to outer sensor mounting frame 60, and any torsional movement of outer sensor mounting frame 60 relative to fixed frame 61.

In operation a force applied to the outer sensor mounting frame 60 in the positive or negative x-direction of FIG. 7 will cause displacement of outer sensor mounting frame 60 in the positive or negative x-direction. It is noted that inner sensor mounting frame 64 will move in concert with outer sensor mounting frame 60, since these two members cannot move relative to each other in the x-direction. Similarly, a force applied in the positive or negative y-direction to inner sensor mounting frame 64 will cause displacement of this inner sensor mounting frame in the positive or negative y-direction, with no accompanying movement in the x-direction.

The force applied to cause displacement of the inner or outer sensor mounting frames may be provided by many types of linear actuators. The linear actuation method preferred by the Applicants, for example, makes use of magnetic deflection coils; which may be called or referred to as voice coils. These devices provide frictionless one-axis movement using an annular current-carrying coil freely suspended inside a passive magnetic assembly which provides a radial magnetic field. Varying the magnitude or direction of the current to the coil correspondingly varies the magnitude or direction of the force. In FIG. 7, the linear actuator used for y deflection is labeled generally as 71, and the linear actuator used for x deflections is labeled generally as 72. For the y deflection linear actuator, one half of the coil/magnet apparatus is mounted on the inner sensor mounting frame, and the other half on the outer sensor mounting frame. Similarly, for the x linear actuator, one half of the coil/magnet apparatus is mounted on the outer sensor mounting frame, and the other half is mounted on the fixed frame 61.

A first and second position sensing means, as described earlier, are mounted in orifices 73 and 74 of inner sensor mounting frame 64, and provide necessary position information to be fed back to the position adjustment means. At a minimum, the position sensing means should be positioned so that the reference magnet of one position sensing means does not affect the other position sensing means. If desirable, the x-direction position sensing means can alternately be mounted in outer sensor mounting frame 60, rather than the inner sensor mounting frame. A simple servo controller or microcontroller may be used to translate misalignment signals from the position sensing means to the position adjustment means.

Figure 8:
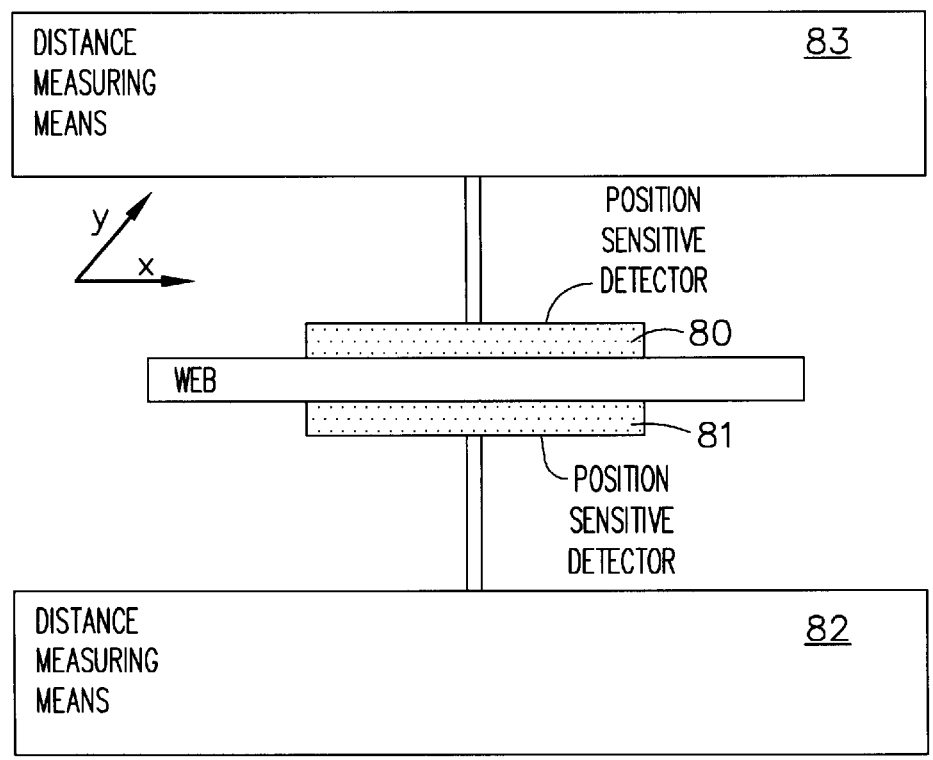
FIG. 8 shows a side view of one possible initial thickness measurement apparatus alignment device.

As has been noted, the purpose of the position adjustment means is to keep the measurement spots of the two distance determining means precisely aligned with one another on the web. This requires both a successful position adjustment means, such as that described above, and the ability to initially align the measurement spots to the desired positions, which are thereafter controlled by the position adjustment means. In the preferred method developed by the Applicants, this initial alignment is carried out by use of position sensitive detectors, which can be inserted into the measurement gap when the web is not present. As shown in FIG. 8, two position sensitive detectors 80 & 81 (sensitive to light of the desired wavelength for the case of optical distance determining means) are mounted rigidly back to back, such that the top detector measures the x and y positions of the measurement spot for the top distance determining means, and the bottom detector measures the x and y positions of the measurement spot for the bottom distance determining means. Prior to use on the thickness measurement system, the position sensitive detectors are exposed to two beams, from the top and the bottom, which have been established by other means to be precisely colinear. This colinear apparatus could, for example, consist of precisely aligned fiber optic cables mounted from above and below. Readings on the position sensitive detectors are made in this colinear apparatus for top and bottom detectors, and both x and y directions. Thus, it is known that when the upper and lower position sensitive detectors have readings identical to those determined in the colinear apparatus, the radiation impinging on the detectors from top and bottom is aligned both in the x and y directions. The position sensitive detector assembly is then mounted to a movable apparatus allowing precise adjustment in the x and y directions of the position sensitive detector assembly when it is placed in the measurement gap of the thickness measurement system. The position sensitive detector assembly is then inserted into the measurement gap when the web is not present, and the movable apparatus is adjusted in x and y until the position sensitive detector facing the fixed distance determining means (labeled 82 in FIG. 8) reads exactly the same, for x and y, as it did when mounted in the colinear apparatus. Without further positional adjustment to the position sensitive detector apparatus, the control points for both x and y position adjustment means in the opposite head, 83 are now varied until the position sensitive detector facing the movable distance determining means reads exactly the same, for x and y, as it did when mounted in the colinear apparatus. Since the position sensitive detectors now read, for both sides and for both x and y, the same as they did in the colinear apparatus, one can be assured that the measurement spots generated by the two distance determining means line up with one another on the web. The position adjustment means now ensures that this alignment remains in effect even if there is relative movement (for example due to scanning the measurement heads across the web) between the two heads.

Because of the speed and strength of the position adjustment means required to maintain precise alignment of the distance determining means in the midst of sizeable, rapid positioning errors between the two heads (particularly if the heads are scanning across a moving web), protection must be built into the position adjustment means for various error conditions which could otherwise cause damage to the distance determining means or the position sensing and adjustment means. These error conditions are of four basic types: (1) position errors in either x or y which exceed the designed range of the position adjustment means and which therefore can cause excessive force on the position adjustment means; (2) over-current errors in which an excessive current is flowing through the voice coils (usually due to an improper operating condition such as a excessive position error; (3) over-temperature errors in which the safe operating temperature of the voice coils is exceeded; and (4) high-frequency oscillation conditions arising from improper adjustment or function of the position adjustment means.

While errors of types (1)–(3) above can be dealt with in a straightforward manner by reading the appropriate position, current, and temperature signals and disabling the position adjustment means (either by analog or digital signal handling methods) when one or more of these conditions is in an unacceptable range, oscillation errors of type (4) above requires a more sophisticated approach. The Applicants have developed a technique which detects undesirable oscillation errors and disables the position adjustment means if necessary, while ignoring oscillations (due, for example, to normal vibrations in the course of operation) whose magnitude and/or frequency are in a range for which no damage could result. The preferred technique makes use of a microcontroller which can read the x or the y misalignment signal from the position measurement means at a given frequency, f. If the misalignment signal has changed slope (for example, reading number n is greater than reading number (n−1), but reading number (n−1) was less than reading number (n−2), a signal reversal is considered to have occurred. If the absolute difference between readings n and (n−1) are furthermore larger than a specified threshold value, then the reversal is counted by a reversal counter; if less than the threshold value, the reversal is not counted. The count of reversals is carried out for a specified length of time (or averaged over several such intervals) and the resulting count (or average count) of reversals is compared to a specified reversal counter limit value. If the reversal limit value is exceeded, an unacceptable oscillation level is determined to be occurring and the position adjustment means can be disabled to prevent damage to the system. Proper choice of the measurement frequency, the reversal threshold, and the reversal counter limit results in the desired monitoring of the position adjustment means. For example, low frequency position variations (low frequency in the sense of being much slower than the frequency at which the position signals are read), which would cause no damage to the system, are ignored in this technique because, unless their amplitudes are extremely large, consecutive position values will not differ from one another sufficiently to exceed the reversal threshold. Medium or higher frequency oscillations, on the other hand, will have sufficient point-to-point variability to exceed this threshold (provided the threshold is set appropriately), and detection of this condition can be used to disable the position adjustment means. Of course, oscillations with amplitude smaller than the threshold value will never exceed the threshold, regardless of frequency. In this way, oscillations whose frequency and amplitude are in a range which could cause damage to the system can automatically be recognized and acted upon, while oscillations which are too small or slow will be ignored.

To achieve optimum results, and the best caliper accuracy, two further correction techniques are applied to the distance determining means. While for the most part, the following components comprise a temperature compensating means, other environmental factors and small calibration drifts may also be corrected with the following techniques. The Applicants also note that other temperature compensating means, as well as other compensation and off-line calibration means will be known to the reader, and in many cases, the choice of these techniques will depend on the chosen system components, for the distance determining means, the position sensing means, the position adjustment means, and the z-sensor means.

Two preferred compensation and calibration techniques are now described. First, the z-sensor can be subject to substantial temperature variation, particularly in cases where the thickness measurement device scans on and off a hot web. Effects of these temperature changes can be minimized by controlling the temperature both of the z-sensor electronic circuitry (which can be located remote from the z-sensor source/detector coil), by means of controlling the temperature of the head enclosure where the circuitry is located, and of the z-sensor source/detector coil itself. In the preferred method for controlling the temperature of the source/detector coil, the coil is enclosed in an annular channel through which temperature-controlled air is circulated.

Second, slow temperature-induced drifts in the thickness measurement apparatus, or slow drifts due to aging in the calibrations of either the z-sensor or the distance determining means, can cause errors in the thickness determination which are not corrected by the temperature compensation methods so far described. Rather, a direct measurement of the variation in thickness reading due to these slowly-changing effects can be performed to generally correct for such effects of complicated or unknown origin. To correct for these relatively slow drifts, a standard can be mounted in the path of the measurement which allows the thickness measurement apparatus to determine changes in the apparent thickness of this standard. In the case of scanning measurement across a web, this standard could be read each time the scanning heads pass off-sheet. In the case of a stationary measurement system, the standard could periodically be inserted into the measurement path when the web is not present, or the measurement system could be temporarily moved away from the web to allow the standard to be inserted. The standard, for example, may consist of a calibration sample with a known and stable thickness, which is located at the start or end of the scanning path. As the scanning heads pass this calibration sample, the thickness measurement apparatus measures the thickness of the calibration sample and compares the measured value with the known thickness of the sample. Any discrepancy is then be treated as an offset to be subtracted from subsequent measurement of the web product. Of course, this calibration sample must be stable in its physical properties to better than the desired accuracy of the thickness measurement, since any variation in the sample properties can result in an improper correction to the thickness measurements. Materials such as certain ceramics are suitable for this purpose.

The sample may consist of a permanently mounted member lying in the path of the scanning head as it moves off-sheet, or it may consist of a movable member, preferably integral to the thickness measurement apparatus itself, which is positioned in the path of the scanning head when calibration is desired.

Thus since the invention disclosed herein may be embodied in other specific forms without departing from the spirit or general characteristics thereof, some of which forms have been indicated, the embodiments described herein are to be considered in all respects illustrative and not restrictive. For example, while the Applicants have, for the most part, described this invention in terms of a scanning system, it is also suitable for non-scanning systems where thickness measurement is desired. The thickness measurement could be done at a single point, or a plurality of the Applicants' thickness measurement apparatus could be mounted across the web to be measured. The number chosen would be based on the desired resolution of thickness measurements on the web. As a further example, while some of the embodiments describes refer specifically to paper, other sheet materials, such as fabric, plastic, rubber, etc. could also be measured with the Applicants' system. The scope of the invention is to be indicated by the appended claims, rather than by the foregoing description, and all changes which come within the meaning and range of equivalency of the claims are intended to be embraced therein.

What is claimed is:

1. A system for precision measurement of the thickness of a web having a first and second side, the system comprising:
    a first mounting head disposed adjacent to the first side of the web, the first mounting head having:
        a first distance sensor operative to determine a first distance between the first sensor and the first side of the web; and
        a first position sensor operative to determine the position of the first distance sensor relative to the first side of the web;
    a second mounting head disposed adjacent to the second side of the web, the second mounting head having:
        a second distance sensor operative to determine a second distance between the second sensor and the second side of the web; and
        a second position sensor operative to determine the position of the second distance sensor relative to the second side of the web;
    a sensor positioning mechanism attached to the first and second distance sensors, the sensor positioning mechanism operative to adjust the position of the first and second distance sensors in response to the location of the first and second distance sensors determined by respective first and second position sensors; and
    a third distance sensor mounted to the first and second mounting heads and operative to determine a third distance between the first and second mounting heads wherein the thickness of the web is determined by subtracting the first and second distances from the third distance such that any error in measuring the first and second distances is mitigated by the sensor positioning mechanism.

2. The system of claim 1 further comprising a temperature control in communication with the first, second, and third distance sensors, the temperature control operative to maintain a prescribed temperature of the first, second and third distance sensors.

3. The system of claim 2 wherein the temperature control is in communication with the sensor positioning mechanism and the first and second position sensors in order to provide a stable operating temperature of the sensors.

4. The system of claim 1 wherein the web has an x direction and a y direction in the plane of the web and the sensor positioning mechanism is configured to position the first and second distance sensors at a same location in the x direction and the y direction.

5. The system of claim 4 further comprising at least one web stabilizer operative to maintain the web in a prescribed orientation relative to the first and second distance sensors.

6. The system of claim 5 wherein the at least one web stabilizer is an air clamp.

7. The system of claim 6 wherein the air clamp comprises a clamp plate having a circular air channel coincident with the surface of the clamp plate and adjacent to the web.

8. The system of claim 1 wherein the first and second position sensors are selected from the group consisting of:
    RF source and receiver coils;
    Hall devices; and
    magneto resistive devices.

9. The system of claim 1 wherein each of the first and second position sensors comprise:
    a source/detector coil;
    a reference plate; and
    a temperature controller for controlling the temperature of the source/detector coil.

10. The system of claim 9 wherein the temperature controller comprises an annular channel which encloses the coil and through which temperature controlled air is circulated.

11. The system of claim 1 wherein each of the first and second position sensors comprise at least one Hall Effect device and at least one reference magnet.

12. The system of claim 1 wherein the first and second position sensors comprise two Hall Effect devices and a magnet, the Hall effect devices arranged to be affected oppositely by the magnetic field of the reference magnet and affected similarly by temperature changes.

13. The system of claim 1 wherein the first position sensor comprises at least one magneto resistive field-direction device fixedly attached to the first distance sensor and the second position sensor comprises at least one reference magnet fixedly attached to the second distance sensor.

14. The system of claim 1 wherein the sensor positioning mechanism comprises:
    an outer sensor mounting frame movably attached to the first mounting head by at least one first movable support member;
    an inner sensor mounting frame movably attached to the outer sensor mounting frame by at least one second movable support member, the inner sensor mounting frame movable in a direction generally perpendicular to the outer sensor, mounting frame.

15. The system of claim 14 wherein the first and second support members are selected from the group consisting of:
    movable bearings;
    roller bearings;
    linear bushing bearings;
    pivoting structures;
    threaded structures; and
    air cavity structures.

16. The system of claim 14 wherein the first and second support members are elastic strip members.

17. The system of claim 14 wherein the sensor positioning mechanism comprises first and second magnetic deflection coils, each of the magnetic deflection coils providing a displacement force for a respective sensor mounting frame.

18. The system of claim 14 wherein the sensor positioning mechanism is selected from the group consisting of:
    threads;
    air cavity;
    electric motor; and
    pneumatic motor.

19. The system of claim 1 further comprising a calibration device operative to calibrate the first and second distance sensors.

20. The system of claim 18 wherein the calibration device comprises a sample of a known thickness that is measured periodically by the first and second distance sensors to produce an error value.

21. The system of claim 1 wherein the first and second distance sensors are fixedly mounted to respective ones of the first and second mounting heads.

22. The system of claim 1 wherein the first and second distance sensors are selected from the group consisting of:
   laser sensors;
   nuclear sensors;
   IR sensors;
   RF sensors;
   acoustic sensors;
   microwave sensors;
   radar sensors; and
   pneumatic devices.

23. A web measurement system for measuring a thickness of a web having a first and second side, the system comprising:
   a first frame;
   at least one first distance sensor mounted to the first frame and operative to determine a distance from the first frame to the first side of the web;
   a first sensor positioning mechanism attached to the frame and the at least one first distance sensor, the first sensor positioning mechanism operative to direct the at least one first distance sensor to a prescribed location on the first side of the web;
   a second frame;
   at least one second distance sensor mounted to the second frame and operative to determine a distance from the second frame to the second side of the web;
   a second sensor positioning mechanism attached to the frame and the at least one second distance sensor, the second sensor positioning mechanism operative to direct the at least one second distance sensor to the prescribed location on the second side of the web; and
   a third distance center attached to the first frame and the second frame, the third distance sensor operative to determine the distance between the at least one first sensor and the at least one second sensor;
   wherein the first and second sensor positioning mechanisms are operative to direct the at least one first and second distance sensors to about the same location on respective first and second sides of the web.

24. The system of claim 23 further comprising a location sensor operative to determine the position of the at least one first and second distance sensors.

25. The system of claim 24 wherein the location sensor comprises a first location sensor attached to the at least one first distance sensor and a second location sensor attached to the at least one second distance sensor, the first and second location sensors being operative to determine whether the first and second distance sensors are coaxially aligned over the first and second sides of the web.

26. The system of claim 25 wherein the location sensor is in electrical communication with the sensor positioning mechanism and the location sensor is operative to align the at least one first and second distance sensors coaxially.

27. A method of measuring the thickness of a web having a first and second side, the method comprising the steps of:
   a) providing a first distance sensor on the first side of the web;
   b) providing a first position sensor on the first side of the web;
   c) determining the position of the first distance sensor relative to the first side of the web with the first position sensor;
   d) providing a second distance sensor on the second side of the web;
   e) providing a second position sensor on the second side of the web;
   f) determining the position of the second distance sensor relative to the second side of the web with the second position sensor;
   g) adjusting the respective positions of the first and second distance sensors in response to the positions determined by the respective first and second position sensors such that the first and second distance sensors are aligned and the web is measured at about the same location on both sides of the web;
   h) determining a distance between the first distance sensor and the first side of the web to find a first distance;
   i) determining a distance between the second distance sensor and the second side of the web to find a second distance;
   j) determining a distance between the first distance sensor and the second distance sensor to find a total distance; and
   k) computing the thickness of the web by subtracting the first distance and the second distance from the total distance.

28. The method of claim 27 wherein step (g) comprises coaxially aligning the first distance sensor and the second distance sensor in response to the positions of the first and second distance sensors.

* * * * *